(12) United States Patent
Huang et al.

(10) Patent No.: US 9,423,889 B2
(45) Date of Patent: Aug. 23, 2016

(54) ERGONOMIC COMPUTER MOUSE

(71) Applicant: COMPUCASE ENTERPRISE CO., LTD., Tainan (TW)

(72) Inventors: Li-Chun Huang, Tainan (TW); Shu-Shang Chang, Tainan (TW)

(73) Assignee: COMPUCASE ENTERPRISE CO., LTD., Tainan (TW)

( * ) Notice: Subject to any disclaimer, the term of this patent is extended or adjusted under 35 U.S.C. 154(b) by 28 days.

(21) Appl. No.: 14/643,538

(22) Filed: Mar. 10, 2015

(65) Prior Publication Data

US 2015/0261324 A1    Sep. 17, 2015

(30) Foreign Application Priority Data

Mar. 12, 2014 (CN) .......................... 2014 1 0089671

(51) Int. Cl.
*G06F 3/0354* (2013.01)

(52) U.S. Cl.
CPC ... *G06F 3/03543* (2013.01); *G06F 2203/0332* (2013.01)

(58) Field of Classification Search
CPC .................... G06F 3/03543; G06F 2203/0332
USPC ................................................. 345/163–166
See application file for complete search history.

(56) References Cited

U.S. PATENT DOCUMENTS

| | | | | |
|---|---|---|---|---|
| 2002/0118174 A1* | 8/2002 | Rodgers | ............. | G06F 3/03543 345/163 |
| 2003/0103040 A1* | 6/2003 | Koike | ................... | G06F 3/0312 345/163 |
| 2007/0279381 A1* | 12/2007 | Odell | ................. | G06F 3/03543 345/163 |
| 2013/0038533 A1* | 2/2013 | Lo | ........................ | G06F 3/03543 345/163 |
| 2013/0076626 A1* | 3/2013 | Banik | ................. | G06F 3/03543 345/163 |

* cited by examiner

*Primary Examiner* — Larry Sternbane
(74) *Attorney, Agent, or Firm* — Muncy, Geissler, Olds & Lowe, P.C.

(57) ABSTRACT

An ergonomic computer mouse includes a mouse body, left and right lug members, a palm resting body having a height-adjusting member, an actuator configured to be manually operable to deliver a rotational force, and a cam assembly. The height-adjusting member has a pivot portion pivoted to the mouse body and a liftable portion opposite to the pivot portion. The cam assembly is disposed to convert the rotational force to a translational force, and is configured to couple the actuator to the liftable portion such that the translational force is imparted on the liftable portion, to thereby move the liftable portion between upper and lower positions.

9 Claims, 7 Drawing Sheets

ERGONOMIC COMPUTER MOUSE

CROSS-REFERENCE TO RELATED APPLICATION

This application claims priority from Chinese application no. 201410089671.X, filed on Mar. 12, 2014, the disclosure of which is incorporated in its entirety herein by reference.

FIELD OF THE INVENTION

This invention relates to a computer mouse, more particularly to an ergonomic computer mouse.

BACKGROUND OF THE INVENTION

A conventional computer mouse may include a mouse body, two click buttons disposed on the mouse body, and a scroll wheel which is disposed between the click buttons and which can also act as a third button. The conventional computer mouse may further include a support for supporting the hand and wrist of the user. In the conventional computer mouse, and the height of the support cannot be adjusted slightly to accommodate users with different hand sizes.

SUMMARY OF THE INVENTION

Therefore, an object of the present invention is to provide an ergonomic computer mouse which can be used by users with different hand sizes.

Accordingly, an ergonomic computer mouse of the present invention includes a mouse body, left and right lug members, a palm resting body, an actuator, and a cam assembly. The mouse body has front and rear end walls opposite to each other in a lengthwise direction, and a top surface which extends between the front and rear end walls, and which has a click region. Each of the left and right lug members extends rearwardly from the rear end wall in the lengthwise direction to terminate at a ridge end. The palm resting body has a palm resting surface and includes a height-adjusting member which has left and right side walls opposite to each other in a transverse direction relative to the lengthwise direction and facing the left and right lug members, respectively. Each of the left and right side walls has a pivot portion and a liftable portion. The pivot portion is disposed to be pivoted to a corresponding one of the left and right lug members about a pivot axis extending in the transverse direction. The liftable portion is opposite to the pivot portion in a radial direction, and is angularly movable about the pivot axis and between upper and lower positions. The actuator is configured to be manually operable to deliver a rotational force. The cam assembly is disposed to convert the rotational force to a translational force, and is configured to couple the actuator to the liftable portion such that the translational force is imparted on the liftable portion to thereby move the liftable portion between the upper and lower positions.

BRIEF DESCRIPTION OF THE DRAWINGS

Other features and advantages of the present invention will become apparent in the following detailed description of the embodiment of the invention, with reference to the accompanying drawings, in which.

DETAILED DESCRIPTION OF THE EMBODIMENT

Figure 1:
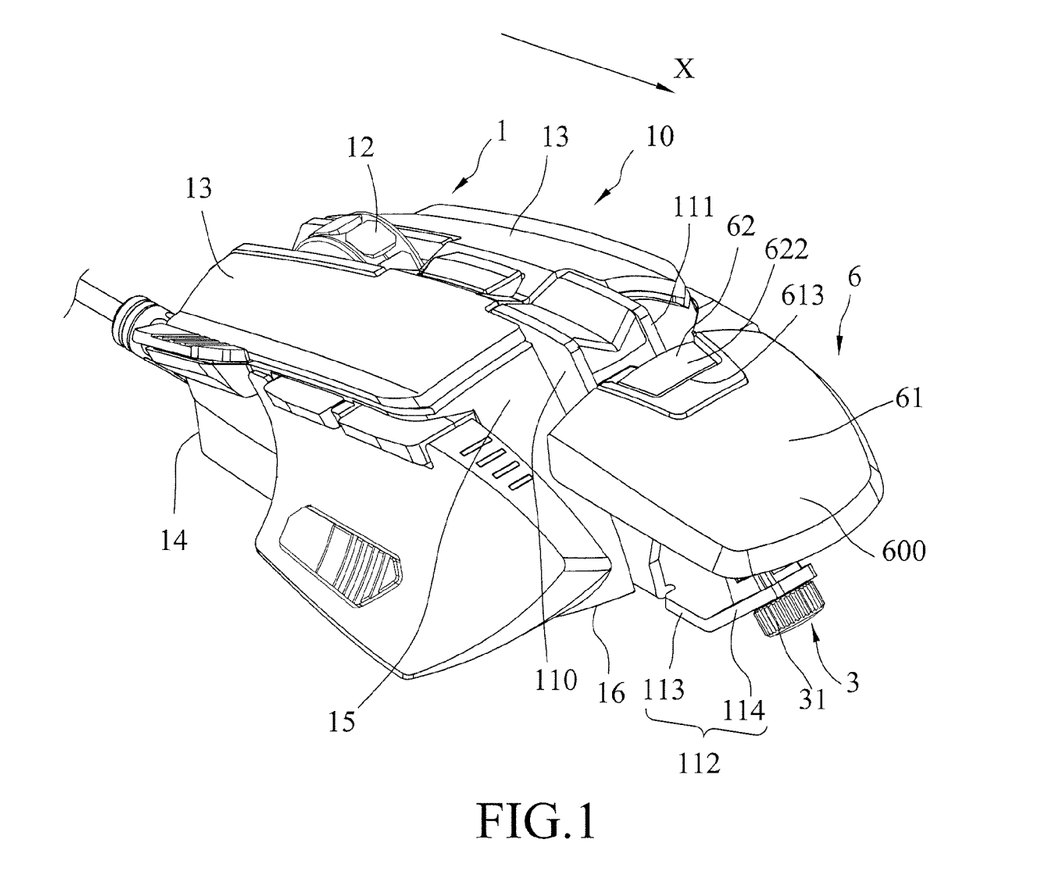
FIG. 1 is a perspective view of an ergonomic computer mouse according to an embodiment of the present invention.
Figure 2:
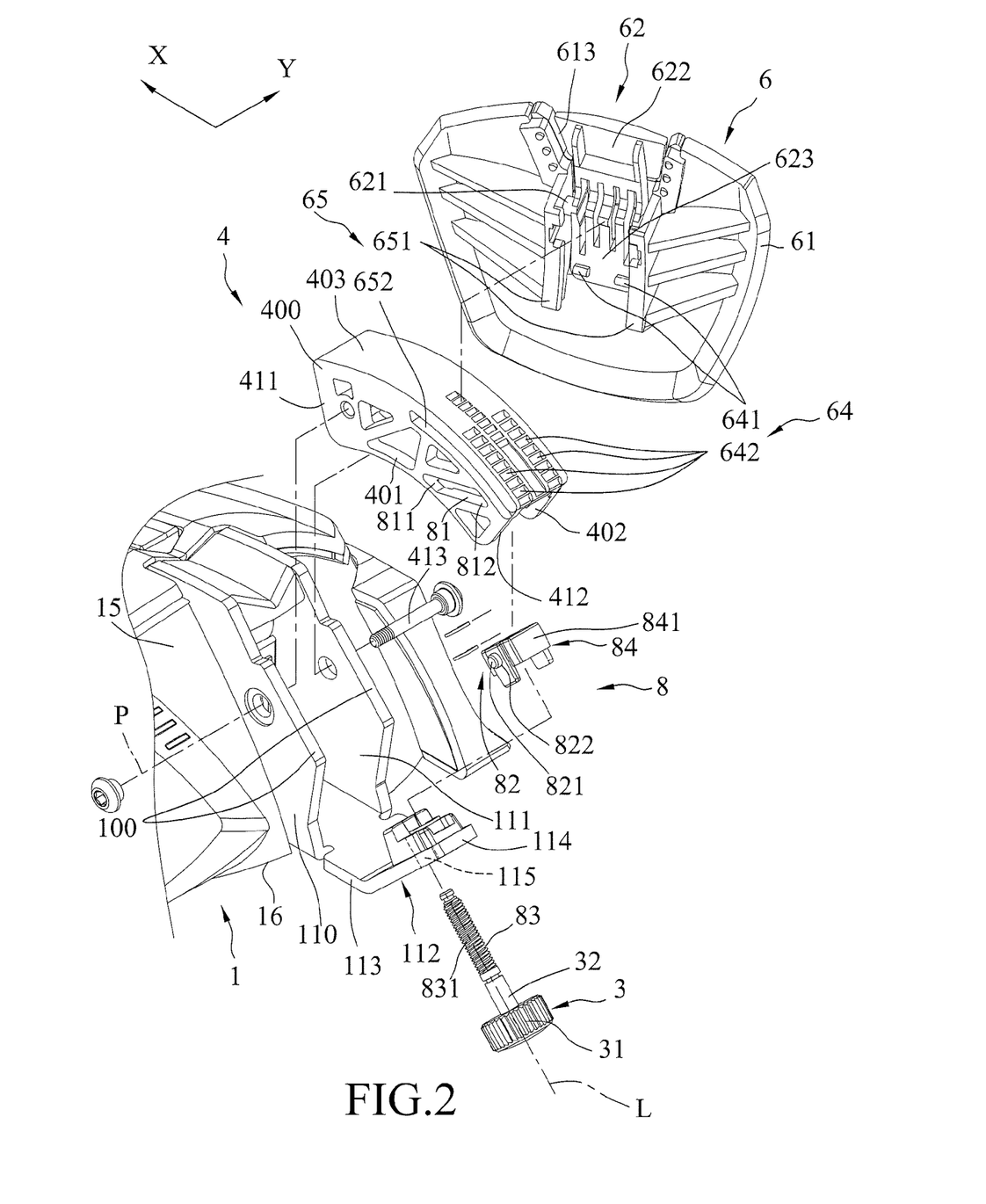
FIG. 2 is a fragmentary exploded perspective view of the ergonomic computer mouse.

With reference to FIGS. 1 and 2, an ergonomic computer mouse according to an embodiment of the present invention is shown to include a mouse body 1, left and right lug members 110, 111, an actuator 3, a palm resting body 6, and a cam assembly 8.

The mouse body 1 has front and rear end walls 14, 15 opposite to each other in a lengthwise direction (X), and a top surface 10 which extends between the front and rear end walls 14, 15, and which has two click regions 13 to serve as two click buttons of the computer mouse. A scroll wheel 12 is disposed between the click regions 13.

Each of the left and right lug members 110, 111 extends rearwardly from the rear end wall 15 in the lengthwise direction (X) to terminate at a ridge end 100.

The palm resting body 6 has a palm resting surface 600, and includes a height-adjusting member 4 having left and right side walls 401, 402, and an interconnecting wall 403 joining upper ends 400 of the left and right side walls 401, 402. The left and right side walls 401, 402 are opposite to each other in a transverse direction (Y) relative to the lengthwise direction (X) and face the left and right lug members 110, 111, respectively.

Figure 3:
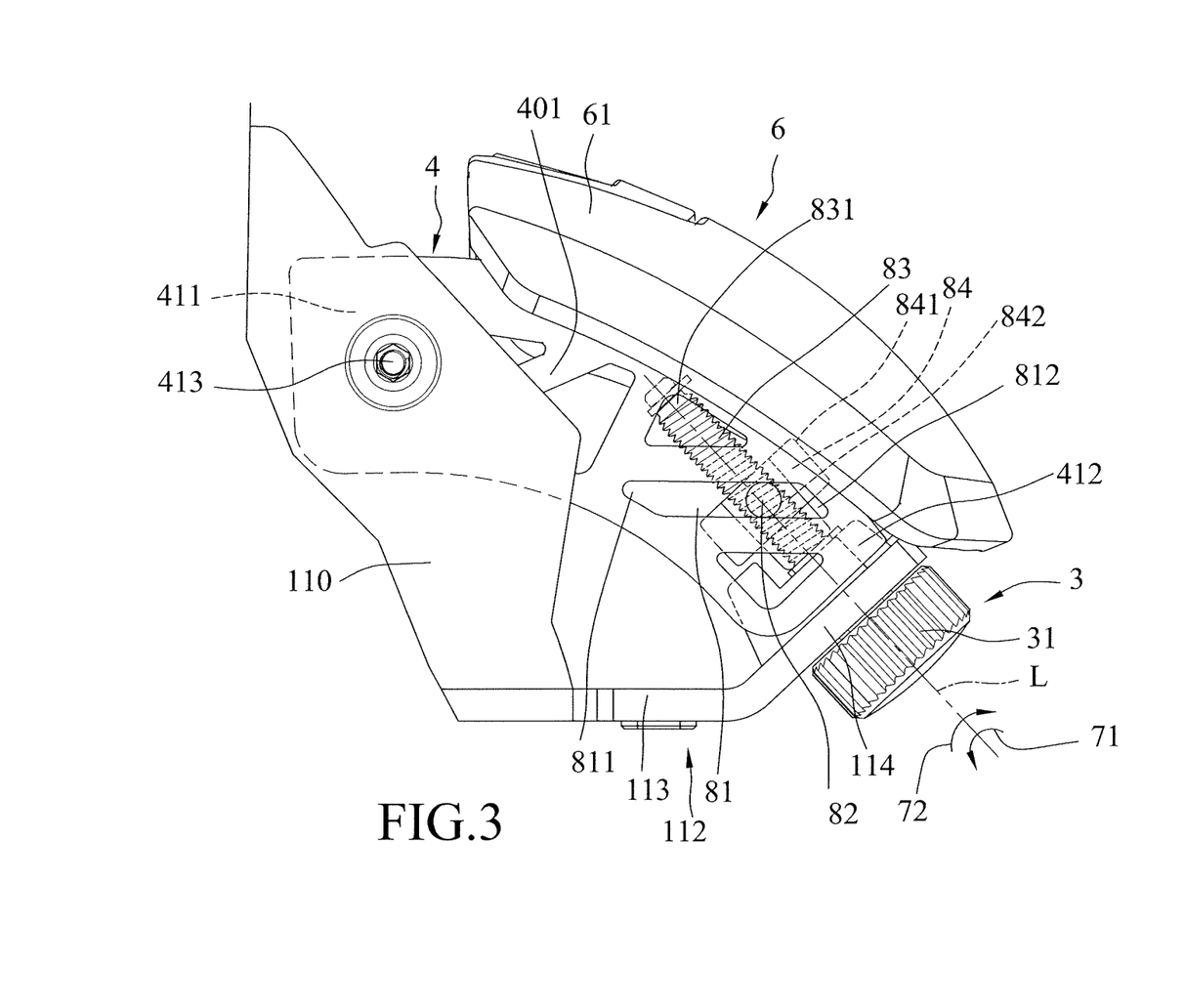
FIG. 3 is a fragmentary side view of the ergonomic computer mouse, illustrating a height-adjusting member in a lower position.

Each of the left and right side walls 401, 402 has a pivot portion 411 and a liftable portion 412. The pivot portion 411 is pivoted to a corresponding one of the left and right lug members 110, 111 about a pivot axis (P) extending in the transverse direction (Y). The liftable portion 412 is opposite to the pivot portion 411 in a radial direction, and is angularly movable about the pivot axis (P) and between an upper position (FIG. 4) and a lower position (FIG. 3). In this embodiment, the pivot portions 411 of the left and right side walls 401, 402 are respectively pivoted to the left and right lug members 110, 111 through a pivot pin 413.

The actuator 3 is configured to manually operable to deliver a rotational force. In this embodiment, the actuator 3 includes a head portion 31 for manual operation and a stem portion 32 which is rotatable about a stem axis (L).

The cam assembly 8 is disposed to convert the rotational force to a translational force, and is configured to couple the actuator 3 to at least one of the liftable portions 412 of the left and right side walls 401, 402 such that the translational force is imparted on the liftable portion 412 to thereby move the liftable portion 412 between the upper and lower positions.

The cam assembly 8 includes a key slot 81, a key member 82, a rod-shaped cam 83, and a tubular follower 84. The key slot 81 is formed in said at least one of the liftable portions 412 of the left and right side walls 401, 402, and extends to terminate at proximate and distal ends 811, 812 relative to the pivot axis (P).

The key member 82 has a key end 821 slidably engaged in the key slot 81, and an actuated end 822 which is opposite to the key end 821 in the transverse direction (Y), and which is configured to impart the translational force, through the key end 821, on said at least one of the liftable portions 412 to move the liftable portions 412 from the upper position (FIG. 4) to the lower position (FIG. 3) when the key end 821 is displaced from the proximate end 811 to the distal end 812.

The rod-shaped cam 83 extends from the stem portion 32 along the stem axis (L) so as to co-rotate with the stem portion 32, and has an outer threaded surface 831.

The tubular follower 84 has an outer surface 841 and an inner threaded surface 842 opposite to the outer surface 841 in radial directions (FIG. 3). The outer surface 841 is configured to permit the actuated end 822 of the key member 82 to be secured thereto. The inner threaded surface 842 is configured to be mated with the outer threaded surface 831 of the rod-shaped cam 83 so as to permit the actuated end 822 to impart the translational force on said at least one of the liftable portions 412 when the rod-shaped cam 83 co-rotates with the stem portion 32 about the stem axis (L).

In this embodiment, the rod-shaped cam 83 and the tubular follower 84 are disposed under the interconnecting wall 403 and between the left and right side walls 401, 402. The cam assembly 8 includes two key slots 81 (only one is shown) and two key members 82 (only one is shown). The key slots 81 are formed in the liftable portions 412 of the left and right side walls 401, 402, respectively. The key members 82 extend oppositely from the outer surface 841 of the tubular follower 84 to be slidably engaged with the key slots 81, respectively.

The ergonomic computer mouse further includes a seat member 112 which includes a connection portion 113 and a free end portion 114 that are opposite to each other in the lengthwise direction (X). The free end portion 114 is disposed rearwardly of the ridge ends 100 of the left and right lug members 110, 111, and has a mounting hole 115 configured to permit the stem portion 32 of the actuator 3 to be rotatably retained therein. The connected portion 113 is secured to a bottom 16 of the mouse body 1.

The palm resting body 6 further includes an extension member 61, a lever member 62, a biasing member 63 (FIG. 5), a retaining mechanism 64, and a guiding member 65.

The extension member 61 is configured to at least partially cover the interconnecting wall 403, and is displaceable relative to and retained with the interconnecting wall 403. The extension member 61 has an upper shell surface which serves as the palm resting surface 600, and is formed with an access opening 613 which provides access to the interconnecting wall 403, and which is proximate to the rear end wall 15.

Figure 5:
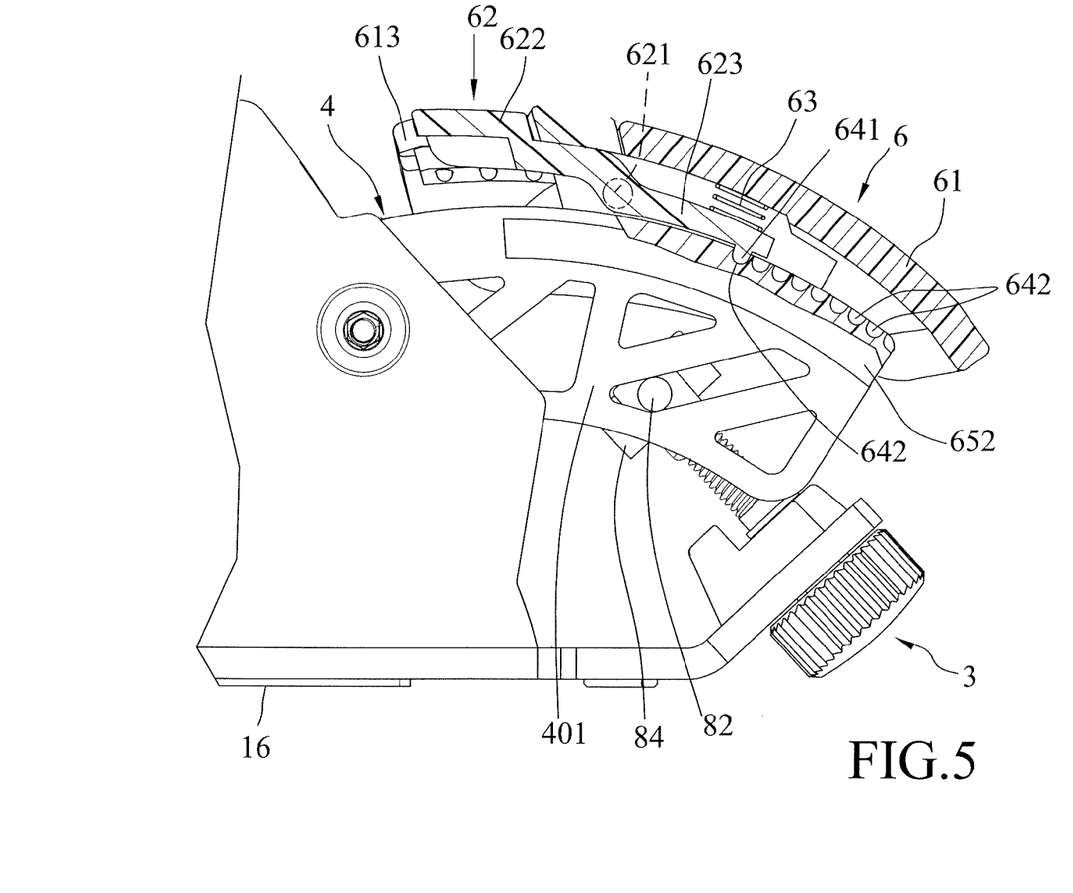
FIG. 5 is a fragmentary sectional view of FIG. 4 illustrating that a weight end of a lever member is in an engaging position and that a protrusion is retained in a selected one of recesses.
Figure 6:
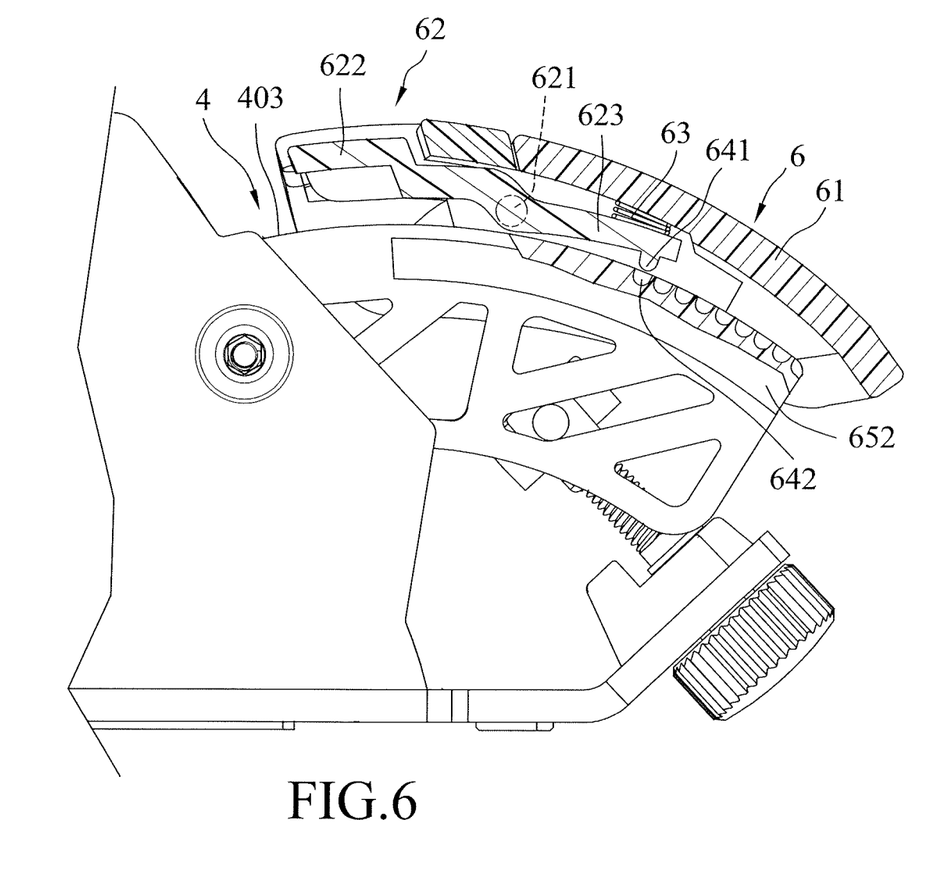
FIG. 6 is similar to FIG. 5 but illustrating the weight end in a disengaging position.

The lever member 62 has a fulcrum portion 621, a power end 622, and a weight end 623. The fulcrum portion 621 is disposed under the upper shell surface 600, and is pivoted to the extension member 61. The power end 622 extends outwardly of the access opening 613 for manual operation. The weight end 623 is disposed between the extension member 61 and the interconnecting wall 403, and is movable between an engaging position (FIGS. 5 and 7), where the weight end 623 is engaged with the interconnecting wall 403, and a disengaging position (FIG. 6).

The retaining mechanism 64 has a protrusion 641 formed on the weight end 623 and a plurality of recesses 642 which are formed in the interconnecting wall 403 and which are displaced from each other in the radial direction. The protrusion 641 is removably retained in a selected one of the recesses 642 so as to permit the extension member 61 to be incrementally displaced relative to the interconnecting wall 403. In this embodiment, the retaining mechanism 64 includes two protrusions 641 and two rows of the recesses 642, each row having the recesses 642 displaced from each other in the radial direction. Each of the protrusions 641 is removably retained in a selected one of a corresponding row of the recesses 642.

The biasing member 63 is disposed to bias the weight end 623 to the engaging position. As shown in FIG. 5, the biasing member 63 is disposed between the weight end 623 and the extension member 61 so as to bias the protrusions 641 into firm engagement with said selected one of the corresponding row of the recesses 642 when the weight end 623 is displaced to the engaging position.

The guiding member 65 includes two keys 651 disposed under the upper shell surface 600, and two keyways 652 (only one is shown in FIG. 2) disposed in the left and right side walls 401, 402, respectively.

Figure 4:
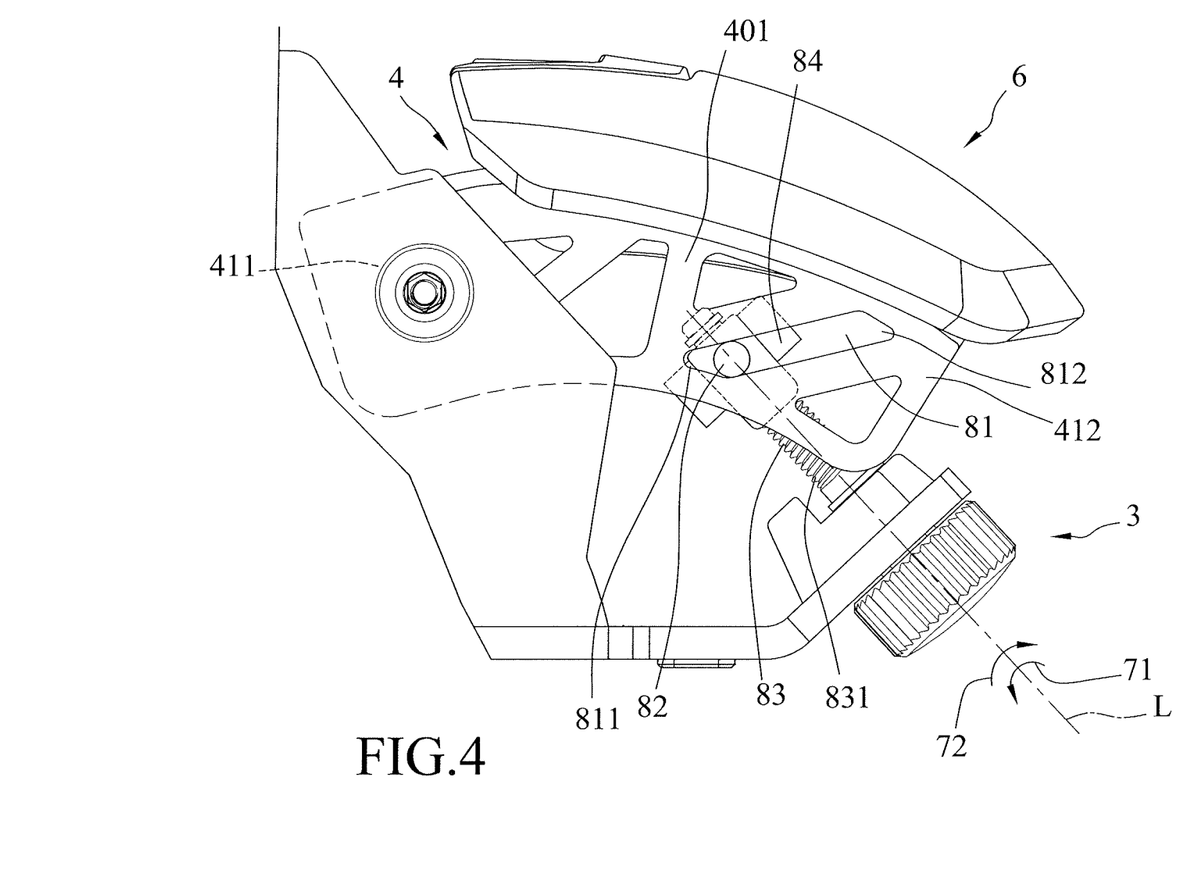
FIG. 4 is similar to FIG. 3 but illustrating the height-adjusting member in an upper position.

When the user rotates the head portion 31 in a counter-clockwise direction 71, the rod-shaped cam 83 is brought to co-rotate with the stem portion 32 (FIG. 2). The rotation of the rod-shaped cam 83 results in a linear displacement of the tubular follower 84 and the key members 82. The tubular follower 84 is moved upwardly along the rod-shaped cam 83, and each key member 82 is displaced from the distal end 812 to the proximate end 811 of a corresponding one of the key slots 81. The linear displacement of the key members 82 results in the displacement of the liftable portions 412 from the lower position (FIG. 3) to the upper position (FIG. 4).

To cause the liftable portions 412 to displace from the upper position (FIG. 4) to the lower position (FIG. 3), it is only necessary to rotate the head portion 31 in a clockwise direction 72.

Figure 7:
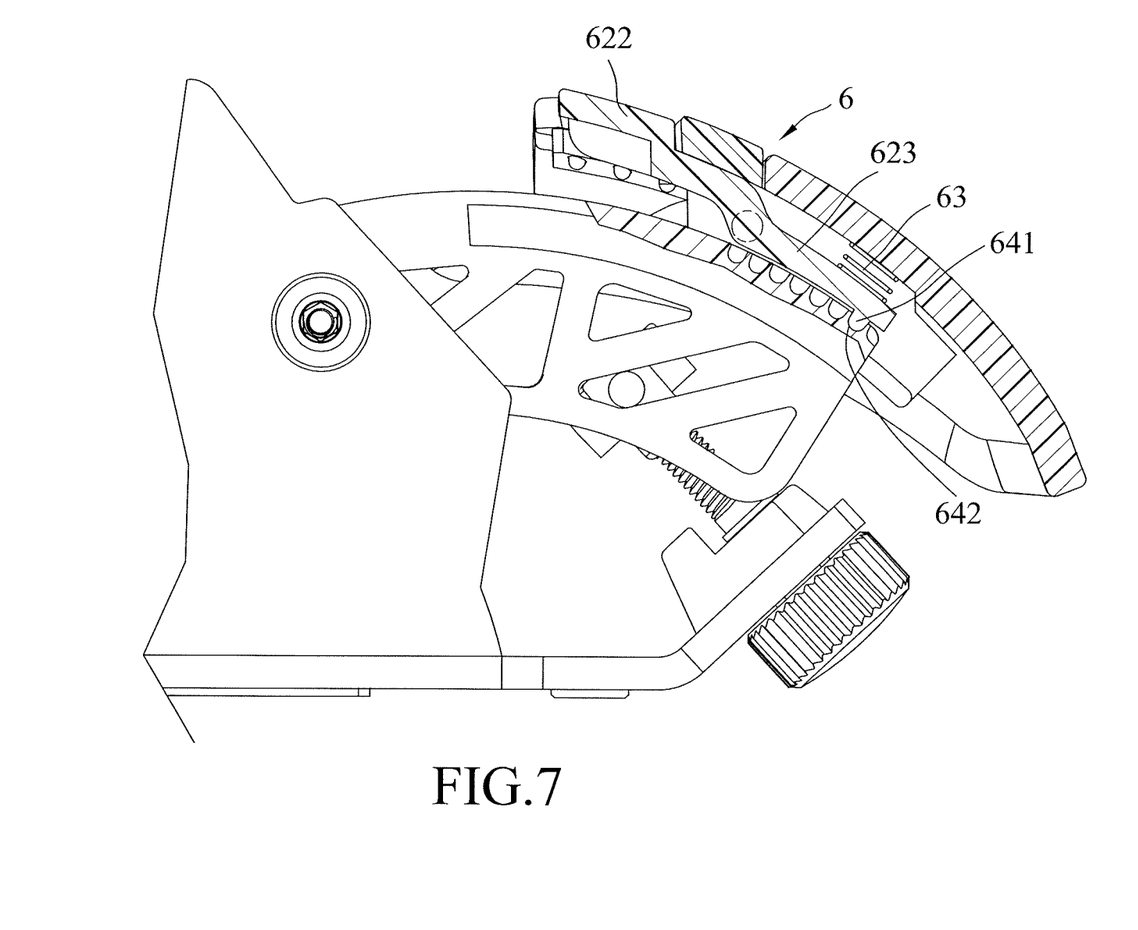
FIG. 7 is similar to FIG. 5 but illustrating that the protrusion is retained in another one of the recesses.

To enable the extension member 61 to displace from a forward position (FIG. 5) to a rearward position (FIG. 7), a pressing force is exerted on the power end 622 of the lever member 62 so as to permit the weight end 623 to be displaced to the disengaging position (i.e., each protrusion 641 is disengaged with a forward one of the corresponding row of the recesses 642) (FIG. 6), and so as to permit displacement of the extension member 61 relative to the interconnecting wall 403. The displacement of the extension member 61 is guided by the guiding member 65 (FIG. 2). When the extension member 61 is displaced to the rearward position, the pressing force is released from the power end 622, and the weight end 623 is biased to the engaging position (i.e., each protrusion 641 is engaged with a rearward one of the corresponding row of the recesses 642) (FIG. 7).

Accordingly, the height and the lengthwise dimension of the ergonomic computer mouse can be slightly adjusted to accommodate users with different hand sizes.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An ergonomic computer mouse comprising:
a mouse body having front and rear end walls opposite to each other in a lengthwise direction, and a top surface which extends between said front and rear end walls, and which has a click region;

left and right lug members each extending rearwardly from said rear end wall in the lengthwise direction to terminate at a ridge end;

a palm resting body having a palm resting surface, and including a height-adjusting member which has left and right side walls opposite to each other in a transverse direction relative to the lengthwise direction and facing said left and right lug members, respectively, each of said left and right side walls having a pivot portion disposed to be pivoted to a corresponding one of said left and right lug members about a pivot axis extending in the transverse direction, and a liftable portion which is opposite to said pivot portion in a radial direction, and which is angularly movable about the pivot axis and between upper and lower positions;

an actuator configured to be manually operable to deliver a rotational force; and a cam assembly which is disposed to convert the rotational force to a translational force, and which is configured to couple said actuator to said liftable portion such that the translational force is imparted on said liftable portion to thereby move said liftable portion between the upper and lower positions.

2. The ergonomic computer mouse according to claim 1, wherein said cam assembly includes a key slot which is formed in at least one of said liftable portions of said left and right side walls, and which extends to terminate at proximate and distal ends relative to the pivot axis, a key member having a key end slidably engaged in said key slot, and an actuated end which is opposite to said key end in the transverse direction, and which is configured to impart the translational force, through said key end, on said liftable portion to move said liftable portion from the upper position to the lower position when said key end is displaced from the proximate end to the distal end.

3. The ergonomic computer mouse according to claim 2, wherein said actuator includes a head portion for manual operation and a stem portion which is rotatable about a stem axis, said cam assembly further including a rod-shaped cam which extends from said stem portion along the stem axis so as to co-rotate with said stem portion and which has an outer threaded surface, a tubular follower having an outer surface configured to permit said actuated end of said key member to be secured thereto, and an inner threaded surface which is opposite to said outer surface in radial directions, and which is configured to be mated with said outer threaded surface so as to permit said actuated end to impart the translational force on said liftable portion when said rod-shaped cam co-rotates with said stem portion about the stem axis.

4. The ergonomic computer mouse according to claim 3, further comprising a seat member which includes a free end portion that is disposed rearwardly of said ridge ends of said left and right lug members, and that has a mounting hole configured to permit said stem portion of said actuator to be rotatably retained therein, and a connected portion that is opposite to said free end portion in the lengthwise direction, and that is secured to a bottom of said mouse body.

5. The ergonomic computer mouse according to claim 1, wherein said height-adjusting member further has an interconnecting wall joining upper ends of said left and right side walls, said palm resting body further including an extension member which is configured to at least partially cover said interconnecting wall, and which is displaceable relative to and retained with said interconnecting wall.

6. The ergonomic computer mouse according to claim 5, wherein said extension member has an upper shell surface which serves as said palm resting surface, and which is formed with an access opening that provides access to said interconnecting wall, and that is proximate to said rear end wall, said palm resting body further including:

a lever member having a fulcrum portion which is disposed under said upper shell surface, and which is pivoted to said extension member, a power end which extends outwardly of said access opening for manual operation, and a weight end which is disposed between said extension member and said interconnecting wall, and which is movable between an engaging position, where said weight end is engaged with said interconnecting wall, and a disengaging position; and a biasing member disposed to bias said weight end to the engaging position.

7. The ergonomic computer mouse according to claim 6, wherein said palm resting body further includes a retaining mechanism having a protrusion formed on said weight end and a plurality of recesses which are formed in said interconnecting wall and which are displaced from each other in the radial direction, said protrusion being removably retained in a selected one of said recesses so as to permit said extension member to be incrementally displaced relative to said interconnecting wall.

8. The ergonomic computer mouse according to claim 7, wherein said biasing member is configured to bias said protrusion into firm engagement with said selected one of said recesses when said weight end is displaced to the engaging position.

9. The ergonomic computer mouse according to claim 6, wherein said palm resting body further includes a guiding member which includes a key disposed under said upper shell surface, and a keyway disposed in one of said left and right side walls.

* * * * *